Figure 1:
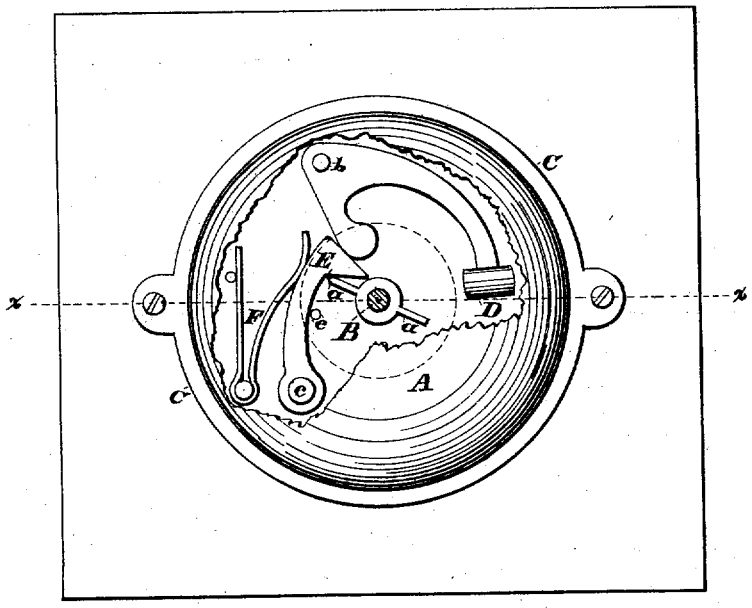

H. A. DIERKES.

Door-Bell.

No. 6,548. Reissued July 20, 1875.

Witnesses:

Thomas J. Kingham.

Arthur C. Fraser.

Inventor:

Henry A. Dierkes.

Per Burke & Fraser

Attorneys.

N. PETERS, PHOTO-LITHOGRAPHER, WASHINGTON, D. C.

UNITED STATES PATENT OFFICE.

HENRY A. DIERKES, OF NEW YORK, N. Y.

IMPROVEMENT IN DOOR-BELLS.

Specification forming part of Letters Patent No. 157,802, dated December 15, 1874; reissue No. 6,548, dated July 20, 1875; application filed July 10, 1875.

*To all whom it may concern:*

Be it known that I, HENRY A. DIERKES, of the city, county, and State of New York, have invented certain new and useful Improvements in Hanging and Operating Bells; and I hereby declare the following to be a full and clear description thereof, which will enable others skilled in the art to make and use the same.

My invention consists partly in the method of hanging the bell by securing it rigidly to the tip of a central operating-spindle, as will be more fully described, and partly in the device for sounding the bell, which consists of a loosely-suspended hammer operated upon by a spring-follower.

In the drawings I have shown my invention as embodied in and adapted to a door-bell.

Figure 2:
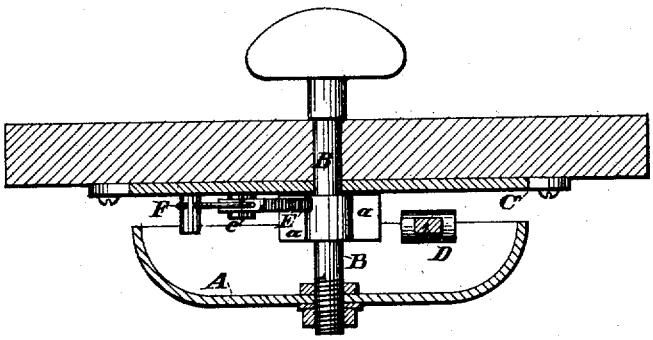

Figure 1 is an elevation view, with a part of the bell broken away to show the mechanism behind it. Fig. 2 is a sectional view of the same, taken in the plane of the line *x x* in Fig. 1.

Let A represent a bell of any approved form. This bell is rigidly secured to and mounted upon a central post or spindle, B. This post B forms the sole support of the bell, and is arranged to be rotated in bearings in a base-plate, C, located just below the mouth of the bell, and secured, in this case, to a door. The spindle B may be provided with a handle or knob, by which to give it a rotary motion, and have attached to it arms *a a*, to act upon the sounding mechanism.

The base-plate C may be of any desired size or shape, and to it will be secured the striking or sounding mechanism. This consists essentially of a loosely-suspended hammer, D, and a spring-follower, E.

In bells of this class it has heretofore been customary to secure the hammer-head to an elastic or spring arm, and have it held up close to the bell against a stop by a spring; then, when drawn back and allowed to strike smartly against the stop, the momentum acquired by the head carries it onward until the bell is struck, the elasticity of the arm permitting this, and also causing the head to again retract.

This construction is objectionable, as it necessitates repeated and careful adjustments of the hammer to precisely the proper distance from the bell; otherwise the tones produced will not be clear.

In my device the hammer-arm is not in any material degree elastic, nor is it necessary that it should be. The hammer is pivoted loosely to the base-plate at any suitable point, *b*, and in its normal position the head rests some distance from the bell. It is arranged to rest in contact with a follower, E, which is pivoted to the base-plate at any suitable point, *c*, and is habitually thrown forward against a stop, *e*, by a spring, F.

In operating the hammer, the free end of the follower is drawn back a sufficient distance by some suitable mechanism, and then suddenly released, when the spring F throws it forward with violence, and with it the hammer, until the stop *e* arrests the forward motion of the follower. The momentum of the hammer carries it forward until it strikes the bell, when it immediately falls back to rest against the follower, and is ready for another blow.

The follower may be drawn back by any suitable device, applied either externally or internally; but when my method of hanging the bell by mounting it on the tip of a rotating spindle is used, one of the most simple arrangements for the purpose is that shown in the drawing.

In this case there are two or more arms, *a a*, before mentioned, attached to and projecting from the central spindle B, and revolving with it and the bell. As the spindle is rotated these arms come in contact with a projection on the follower E, and force it backward until they pass the end of the said projection, when they suddenly release the follower and permit the spring to throw it and the hammer forward in the manner before described.

By my method of mounting, as shown in the drawings, I am enabled to dispense with any separate support for the bell, as in the usual method of hanging, the one spindle, B, serving both for the purpose of operating the striking mechanism and supporting the bell. It has this additional advantage, that the bell itself rotates, and thus presents, alternately, different points to receive the successive strokes of the hammer.

It is not necessary, however, in using my striking mechanism that the bell should be arranged to revolve. Said mechanism is equally well adapted to stationary bells. In such cases, however, the bell must be supported independently of the mechanism operating the spring-follower.

In the case of large bells, or those placed at some distance from the operator, suitable machinery would have to be introduced to turn the spindle.

Having thus described my invention, I claim—

1. In the mechanism for striking or sounding bells, a loosely suspended or pivoted hammer, D, arranged to be operated upon by a spring-follower, E, and in connection therewith, substantially as specified.

2. The mode of hanging bells herein shown and described, consisting in securing the said bell rigidly to the end of a central revolving spindle, B, so that the bell may be solely supported thereby and revolve therewith.

HENRY A. DIERKES.

Witnesses:
HENRY CONNETT,
ARTHUR C. FRASER.